US00RE43512E

(19) United States
(12) Reissued Patent
Foust

(10) Patent Number: US RE43,512 E
(45) Date of Reissued Patent: Jul. 17, 2012

(54) CHRONOLOGICALLY STACKED COUPON MAILER

(75) Inventor: Steven B. Foust, Spring Lake Park, MN (US)

(73) Assignee: C.G.H. Inc., Spring Park, MN (US)

(21) Appl. No.: 13/157,022

(22) Filed: Jun. 9, 2011

Related U.S. Patent Documents

Reissue of:
(64) Patent No.: 7,543,853
Issued: Jun. 9, 2009
Appl. No.: 11/148,150
Filed: Jun. 8, 2005

(51) Int. Cl.
*B42D 5/00* (2006.01)

(52) U.S. Cl. ..... 283/51; 283/56

(58) Field of Classification Search ..... 283/2, 51, 283/56; 281/38
See application file for complete search history.

(56) References Cited

U.S. PATENT DOCUMENTS

| | | | | |
|---|---|---|---|---|
| 737,049 | A | 8/1903 | Walker | |
| 1,110,367 | A | 9/1914 | Wood | |
| 1,932,153 | A * | 10/1933 | Bergendahl | 281/22 |
| 2,108,749 | A | 2/1938 | Harris | |
| 2,242,114 | A | 5/1941 | Cramer et al. | |
| 2,391,054 | A | 12/1945 | Kelly | |
| 2,755,576 | A | 7/1956 | Golden | |
| 2,813,728 | A | 11/1957 | Harris | |
| 3,032,904 | A * | 5/1962 | Washburn | 283/2 |
| 3,290,812 | A | 12/1966 | Hunkins | |
| 3,520,560 | A | 7/1970 | Isaac | |
| 4,617,215 | A | 10/1986 | Telesco | |
| 4,643,451 | A | 2/1987 | Coates | |
| 4,676,526 | A | 6/1987 | Redman | |
| 4,685,699 | A | 8/1987 | Hirasawa | |
| 4,795,195 | A | 1/1989 | McClain, Jr. | |
| 4,974,878 | A | 12/1990 | Josephson | |
| 5,104,146 | A | 4/1992 | Schulz et al. | |
| 5,320,334 | A | 6/1994 | DeAngelis | |
| 5,390,819 | A | 2/1995 | Kaye | |
| 5,457,904 | A | 10/1995 | Colvin | |
| 5,458,282 | A | 10/1995 | Martin | |
| 5,547,225 | A | 8/1996 | DeAngelis | |
| 5,727,817 | A | 3/1998 | Kraige | |
| 5,776,591 | A | 7/1998 | Mertens | |
| 6,273,660 | B1 | 8/2001 | Ozgen et al. | |
| 6,718,673 | B2 | 4/2004 | Ray, III et al. | |
| 6,898,880 | B2 | 5/2005 | Best et al. | |
| 6,940,377 | B1 | 9/2005 | Martin | |
| D511,793 | S | 11/2005 | Rittman et al. | |

(Continued)

FOREIGN PATENT DOCUMENTS

JP 11348452 * 6/1998

(Continued)

OTHER PUBLICATIONS

Translation of JP11348452.*

(Continued)

*Primary Examiner* — Edward Tolan
*Assistant Examiner* — Kyle Grabowski
(74) *Attorney, Agent, or Firm* — Dicke Billig & Czaja

(57) ABSTRACT

A coupon mailer with a plurality of stacked sheets interconnected along opposite edges. Each sheet has a plurality of detachable redeemable coupons redeemable through a redemption period. The sheets are chronologically stacked based upon the redemption period of the coupons on the sheet.

26 Claims, 4 Drawing Sheets

U.S. PATENT DOCUMENTS

| | | | |
|---|---|---|---|
| 7,055,273 | B2 | 6/2006 | Roshkoff |
| 7,063,258 | B1 | 6/2006 | Karolewicz |
| 7,225,568 | B1 | 6/2007 | Rizzo et al. |
| 2001/0042010 | A1 | 11/2001 | Hassell |
| 2003/0070338 | A1 | 4/2003 | Roshkoff |
| 2003/0077465 | A1 | 4/2003 | Boudouris et al. |
| 2004/0060217 | A1 | 4/2004 | Ray, III et al. |
| 2004/0103569 | A1 | 6/2004 | D'Angelo et al. |
| 2006/0019050 | A1 | 1/2006 | Gilmer |
| 2006/0037221 | A1 | 2/2006 | Reynolds |

FOREIGN PATENT DOCUMENTS

| | | | |
|---|---|---|---|
| JP | 2005111871 | * | 10/2003 |

OTHER PUBLICATIONS http://www.monstermagnet.com/images/Einstein_front_lrg.jpg, Feb. 8, 2005. Archive webpage from www.archive.org.

Coupon from http://www.monstermagnet.com/images/Einstein_front_lrg.jpg, Feb. 8, 2005□□□□Archive web page from www.archive.org.*

* cited by examiner

CHRONOLOGICALLY STACKED COUPON MAILER

Matter enclosed in heavy brackets [ ] appears in the original patent but forms no part of this reissue specification; matter printed in italics indicates the additions made by reissue.

BACKGROUND

Coupons are a much utilized aspect of advertising. Consumers redeem coupons to obtain goods and/or services at a reduced price. Business owners utilize coupons in an effort to increase sales. One of the keys to achieving good consumer response to coupon-based advertising is providing the coupon in such a fashion that the coupon is saved in a conspicuous location for an extended period of time to enhance the chances that the consumer will remember the coupon when the consumer needs to purchase the type of goods and/or services advertised on the coupon.

Many businesses and cooperative advertisers mail sheets containing a plurality of coupons—commonly known as coupon mailers—with an attached magnet so that consumers may attach the coupon mailer to the side of a metal appliance (e.g., a refrigerator or a filing cabinet). These coupon mailers commonly provide cut lines or lines of perforation between coupons to facilitate removal of individual coupons from the coupon mailer.

While such magnetized coupon mailers enjoy a reasonable cost per redemption (i.e., cost to produce and mail the coupon mailer divided by the number of coupons redeemed) a continuing need exists for a coupon mailer having an enhanced cost per redemption.

SUMMARY OF INVENTION

The invention is a coupon mailer. The coupon mailer includes a plurality of stacked sheets interconnected along opposite edges. Each sheet has a plurality of detachable redeemable coupons redeemable through a redemption period. The sheets are chronologically stacked based upon the redemption period of the coupons on the sheet.

A preferred embodiment of the coupon mailer has sheets which are each divided into at least (i) a header panel defining the top edge, (ii) a spine integrally connected with and longitudinally extending from the header panel, and (iii) a first set of coupons laterally extending from the spine in a first lateral direction with each coupon having (A) a proximal end directly attached to the spine, (B) an unsupported distal end opposite the proximal end, (C) a line of separation along the interface of the spine and the coupon, and (D) printed indicia on the first major surface. A magnet is attached to the second major surface of the lowermost sheet in the stack of sheets.

DETAILED DESCRIPTION OF THE INVENTION INCLUDING A BEST MODE

Nomenclature

Figure 1:
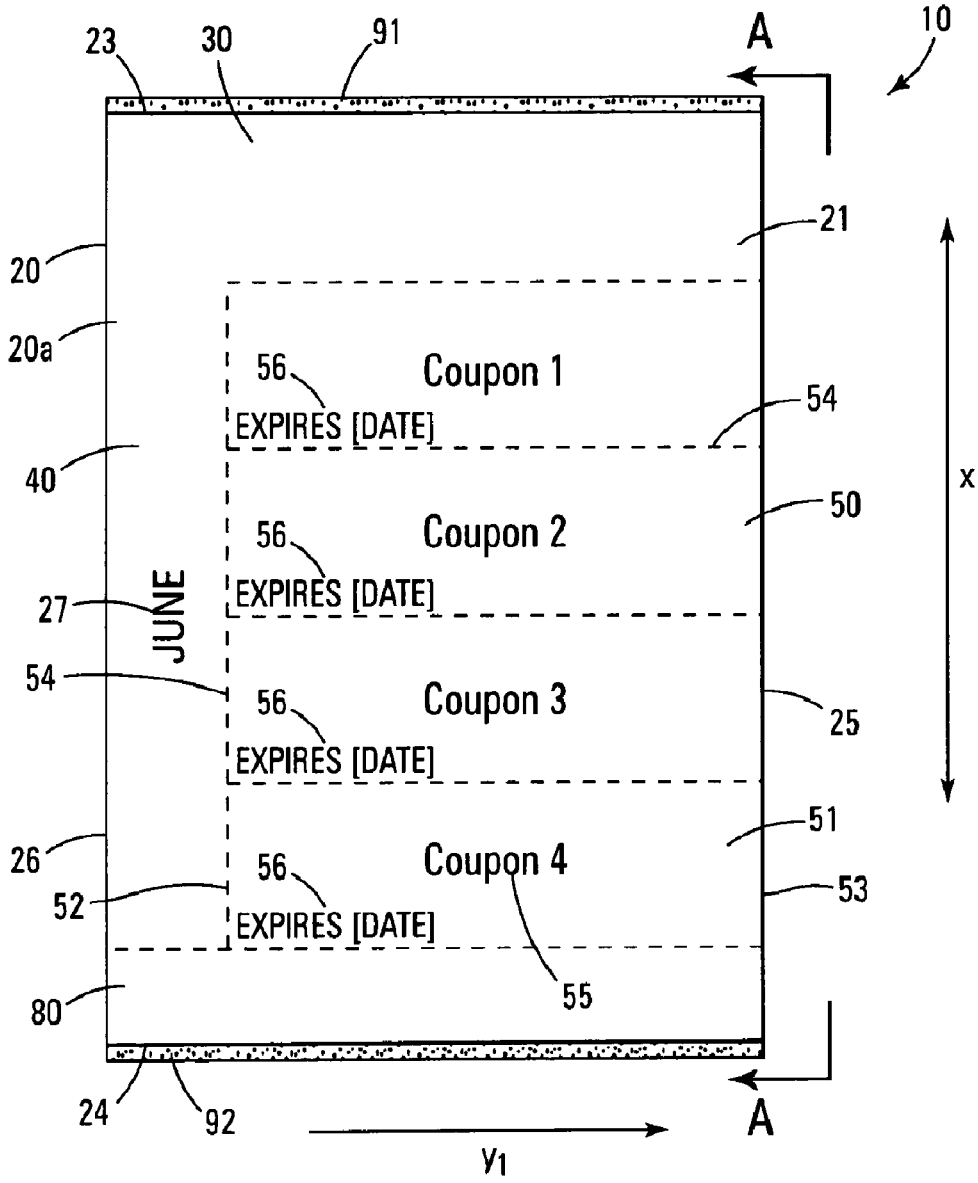
FIG. 1 is a front view of one embodiment of the invention with a first set of coupons.

10 Coupon Mailer
20 Sheet
20a Uppermost Sheet
20b Intermediate Sheets
20c Lowermost Sheet
20h Sheet Height
20w Sheet Width
21 First Major Surface
22 Second Major Surface
23 Top Edge of Sheet
24 Bottom Edge of Sheet
25 Right Side Edge of Sheet
26 Left Side Edge of Sheet
27 Indicia Indicating Redemption Period for Coupons On the Sheet
30 Header Panel
40 Spine
50 First Set of Coupons
51 Coupon
52 Proximal End of Coupon
53 Distal End of Coupon
54 Line of Separation
55 Printed Indicia
56 Expiration Date
60 Magnet
70 Second Set of Coupons
71 Coupon
72 Proximal End of Coupon
73 Distal End of Coupon
74 Line of Separation
75 Printed Indicia
80 Footer Panel
84 Line of Separation
91 Adhesive Along Top Edge
92 Adhesive Along Bottom Edge
x Longitudinal Direction
y Lateral Direction
$y_1$ First Lateral Direction
$y_2$ Second Lateral Direction

Construction

Referring to FIGS. 1-4, the coupon mailer 10 includes a plurality of stacked sheets 20 including at least an uppermost sheet 20a and a lowermost sheet 20c. The coupon mailer 10 also preferably includes at least one intermediate sheet 20b.

Each of the sheets 20 forming the coupon mailer 10 include a top edge 23, a bottom edge 24, a right side edge 25 and a left side edge 26. The sheets 20 are interconnected along opposite edges (e.g., the top edge 23 and bottom edge 24, or the right side edge 25 and left side edge 26). The sheets 20 may be interconnected by any known means for interconnecting such sheets 20 including pressure sensitive adhesives, hot melt adhesives, staples, rivets, etc. As shown in FIGS. 1-5, the sheets 20 may preferably be interconnected by a layer of hot melt adhesive 91 extending along the aligned top edges 23 of the stacked sheets 20 and a layer of hot melt adhesive 92 along the aligned bottom edges 24 of the stacked sheets 20.

Figure 2:
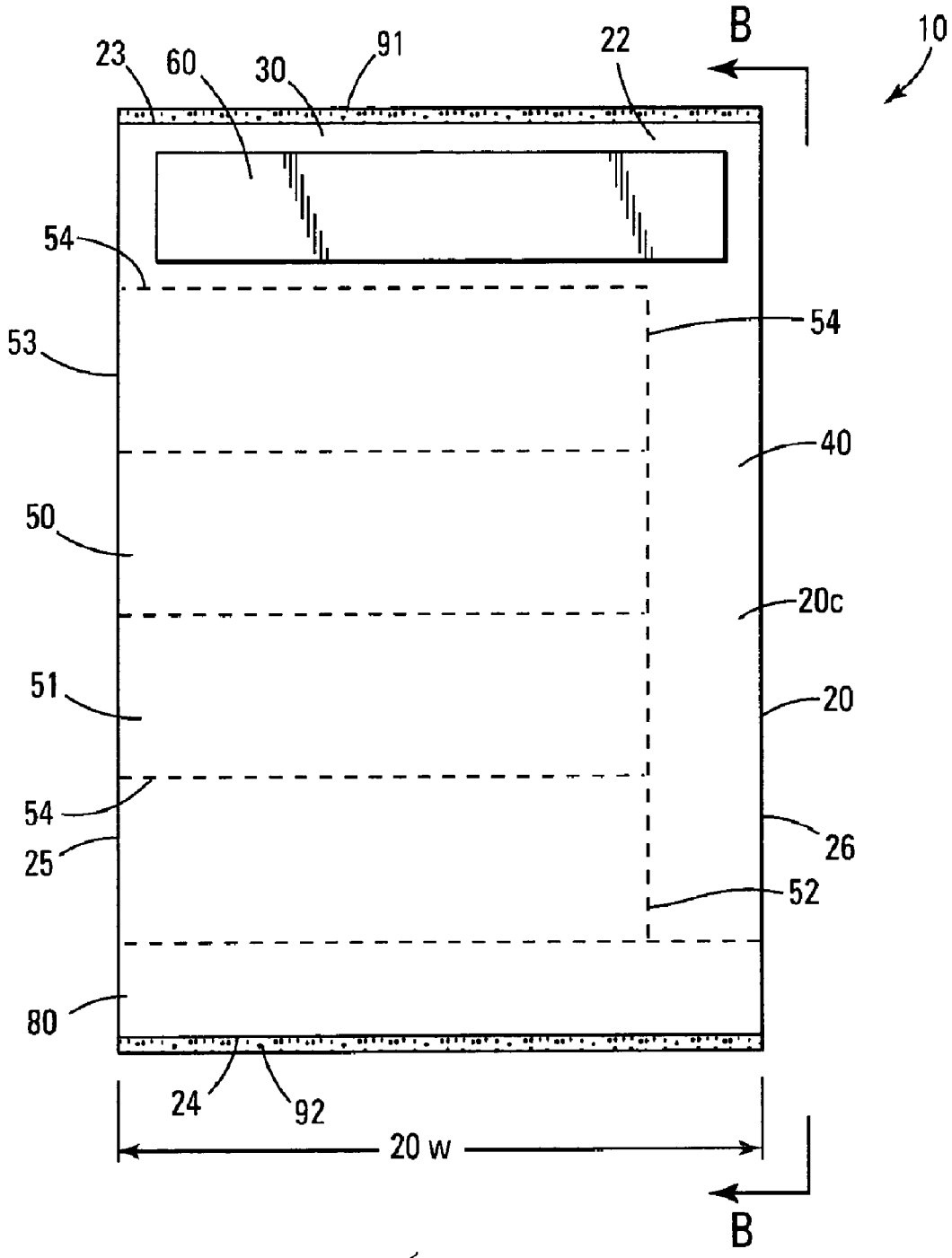
FIG. 2 is a back view of the invention in FIG. 1.

As shown in FIGS. 1 and 2, each sheet 20 has a first major surface 21 and a second major surface 22. Each sheet 20 has at least a first set of detachable redeemable coupons 50 and a commons area (such as a header panel 30 and/or a spine 40). Each coupon 51 on the sheet 20 bears an expiration date 56. The coupons 51 on each sheet 20 define a redemption period during which the coupons 51 on the sheet 20 may be redeemed. The commons area on the sheet 20 is imprinted with an indication of the redemption period for the coupons 51 on the sheet 20 (e.g., 2005, JUNE, MAY 1-7, GOOD THROUGH SEPTEMBER $10^{th}$, GOOD LABOR DAY ONLY, etc.).

The sheets 20 forming each coupon mailer 10 are chronologically stacked based upon the redemption period for the coupons 51 on the sheet 20. Examples of suitable chronology are set forth in Table One below.

TABLE ONE

| REDEMPTION PERIOD | | | | |
|---|---|---|---|---|
| DURATION/TYPE | UPPERMOST SHEET | UPPER INTERMEDIATE SHEET | LOWER INTERMEDIATE SHEET | LOWERMOST SHEET |
| Individual and District Redemption Periods | | | | |
| (Annual) | 2005 | 2006 | 2007 | 2008 |
| (Quarterly) | January-March | April-June | July-September | October-December |
| (Monthly) | June | July | August | September |
| (Weekly) | May 1-7 | May 8-14 | May 15-21 | May 22-28 |
| (Weekends Only) | Saturday-Sunday May $3^{rd}$ and $4^{th}$ | Saturday-Sunday May $10^{th}$ and $11^{th}$ | Saturday-Sunday May $17^{th}$ and $18^{th}$ | Saturday-Sunday May $24^{th}$ and $25^{th}$ |
| (Sporadic) | Saturday-Sunday May $3^{rd}$ and $4^{th}$ | Thursday-Friday May $8^{th}$ and $9^{th}$ | Saturday-Sunday May $10^{th}$ and $11^{th}$ | Thursday-Friday May $15^{th}$ and $16^{th}$ |
| Overlapping Redemption Periods | | | | |
| (Year) | 2005 | Jun. 1, 2005-Jun. 1, 2006 | 2006 | Jun. 1, 2006-Jun. 1, 2007 |
| (Quarter) | January-March | February-April | March-May | April-June |
| (Month) | June | June $15^{th}$ July $15^{th}$ | July | July $15^{th}$ Aug $15^{th}$ |
| (Week) | May 1-7 | May 6-14 | May 13-20 | May 19-26 |
| (Sporadic) | May $1^{st}$-$7^{th}$ | Thursday-Friday May $4^{th}$ and $5^{th}$ | May $8^{th}$-$14^{th}$ | Thursday-Friday May $11^{th}$ and $12^{th}$ |

Each sheet 20 in the coupon mailer 10 includes indicia 27 on the first major surface 21 of the sheet 20 indicating the redemption period for the set of coupons 50 on the sheet 20. Such indicia 27 may be position anywhere on the first surface 21 of the sheet 20 but is preferably located on a commons area of the sheet 20.

The sheet 20 may be configured and arranged as desired, with a preferred configuration dividing the sheet 20 into a commons area having a header panel 30 and a spine 40, a first set of coupons 50, and a detachable footer panel 80.

The sheet 20 may be made from any suitable material such as paperboard, paper, and cardboard. Preferably the sheet 20 and another one is made from paperboard.

The sheets 20 may have any desired size and shape. Preferably the sheets 20 are uniformly sized with a height 20h between about 8 to 20 inches and a width 20w of between about 8 to 20 inches. Most preferably the sheets 20 are rectangular in shape with a height 20h of about 5 inches and a width 20w of about 6 inches.

The sheets 20 forming each coupon mailer 10 may have a uniform size and shape (e.g., rectangular sheets 20 having a consistent height 20h and width 20w), may have an alternating size and shape (e.g., every other sheet 20 is 0.5 inches shorter than the other sheets 20) or may have unique shapes (e.g., sheet 20 with banked side tabs (not shown)). The sheets 20 in each coupon mailer 10 may be aligned along none, one, some or all edges. Alternatively, none, one, some or all of the edges may be fanned, shingled or similarly offset.

As shown in FIGS. 1 and 2, the coupon mailer 10 may include a spine 40 on each sheet 20 integrally connected with and longitudinally x extending from the header panel 30 to the footer panel 80. The spine 40 may be laterally placed anywhere along the header panel 30 depending on the lateral width (not numbered) of the first set of coupons 50. Preferably the spine 40 is positioned along one of the lateral y sides (not numbered) of the sheet 20. The spine 40 is integrally connected with the header panel 30 to allow the spine 40 and all attached coupons 51 to remain attached to the header panel 30 even if one or more coupons 51 is removed from the sheet 20.

As shown in FIGS. 1 and 2, the coupon mailer 10 includes a first set of coupons 50. The embodiment shown in FIGS. 1-2 includes a first set of coupons 50 laterally extending from the spine 40 in a first lateral direction $y_1$. In this embodiment, the spine 40 is positioned along the left side of the sheet 20. The spine 40 may also be positioned along the right side (unnumbered) of the sheet 20. This would allow the first set of coupons 50 to laterally extend from the spine 40 in a second lateral direction $y_2$.

When the coupon mailer 10 is interconnected along the top edge 23 and the bottom edge 24, each of the sheets 20 preferably include a detachable footer panel 80 which may be quickly and easily removed from the balance of the coupon mailer 10 by the recipient of the coupon mailer 10 in order to allow the recipient to flip through and view underlying sheets 20b and 20c. The footer panel 80 may be conveniently attached to the balance of the coupon mailer 10 along a line of separation 84, such as a line of perforation.

Figure 5:
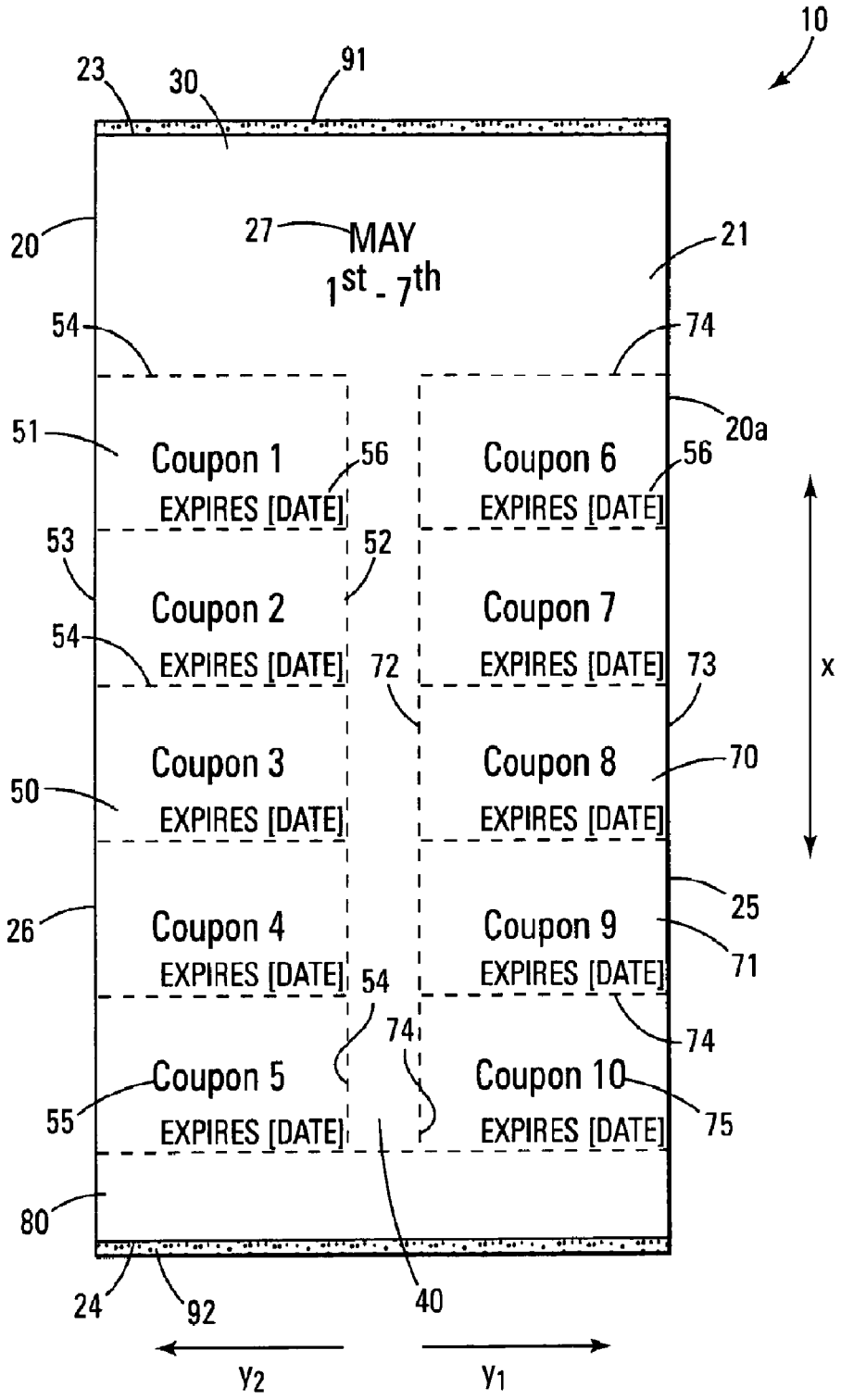
FIG. 5 is a front view of a second embodiment of the invention with a first and second set of coupons.

As shown in FIG. 5, the sheets 20 forming the coupon mailer 10 may have a laterally y centered spine with both a first set of coupons 50 laterally y extending from the spine 40 in a first lateral direction y1 and a second set of coupons 70 laterally y extending from the spine 40 in a second lateral direction $y_2$.

As shown in FIGS. 1 and 5, each coupon 51, 71 in the first set of coupons 50 and the second set of coupons 70 preferably has a proximal end 52 or 72 directly attached to the spine 40, an unattached distal end 53 or 73 opposite the proximal end 52 or 72, a line of separation 54 or 74 along the interface (not numbered) of the spine 40 and the coupon 51 or 71, and printed indicia 55 or 75 on the first major surface 21 of each coupon 51 or 71 as appropriate and customary for redeemable coupons. The line of separation 54 or 74 may be any suitable line of weakness allowing easy removal of each coupon 51 or 71 including lines of perforation, fold lines, and score lines. Preferably, the line of separation 54 or 74 is a line of perforation.

As shown in FIGS. 1 and 5, a line of separation 54 may also be placed along the interface between the first set of coupons 50 and the header panel 30, and between each of the coupons 51. This facilitates removal of each coupon 51 and permits removal of an individual coupon 51 without detaching other coupons 51 from the first set of coupons 50. The lines of separation 54 may be any suitable lines of weakness including lines of perforation, fold lines, and score lines. Preferably the lines of separation 54 are lines of perforation.

As shown in FIG. 5, a line of separation 74 may also be placed along the interface between the second set of coupons 70 and the header panel 30 and between each coupon 71. This facilitates removal of each coupon 71 and permits removal of an individual coupon 71 without detaching other coupons 71 from the second set of coupons 70. The lines of separation 74 may be any suitable lines of weakness including lines of perforation, fold lines, and score lines. Preferably the lines of separation 74 are lines of perforation.

As shown in FIGS. 1 and 5, the first set of coupons 50 and the second set of coupons 70 may include printed indicia 55 or 75 on the first major surface 21. The printed indicia 55 or 75 may be the same on each coupon 51 or 71 or different for each coupon 51 or 71 with the coupons 51 and/or 71 pertaining to the goods and/or services of a single business (e.g., several redeemable coupons for pizzas of different size and with different toppings from a single pizza vendor) or pertaining to the goods and/or services of a multiple business (e.g., one redeemable coupon for pizza from Company AAA, one redeemable coupon for an oil change from Company BBB, two redeemable coupons for one free ice cream cone from Company CCC, etc.) as is customary for cooperative advertising.

Figure 3:
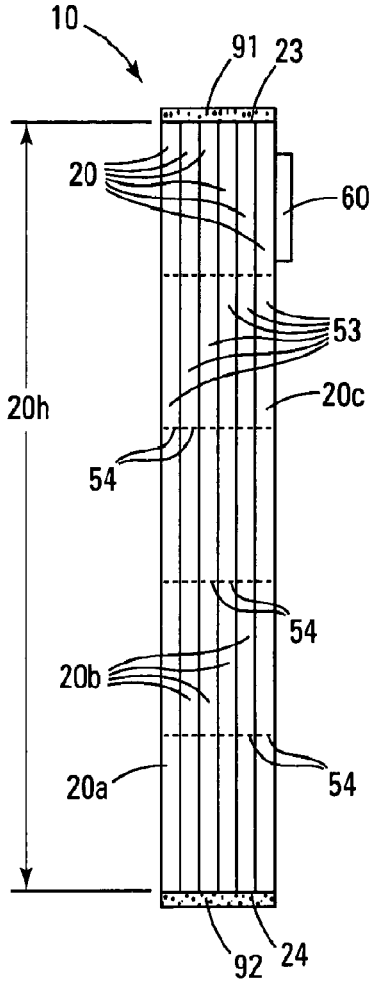
FIG. 3 is a side edge view of the invention in FIG. 1 and FIG. 2 as seen in the direction of arrows A-A in FIG. 1.
Figure 4:
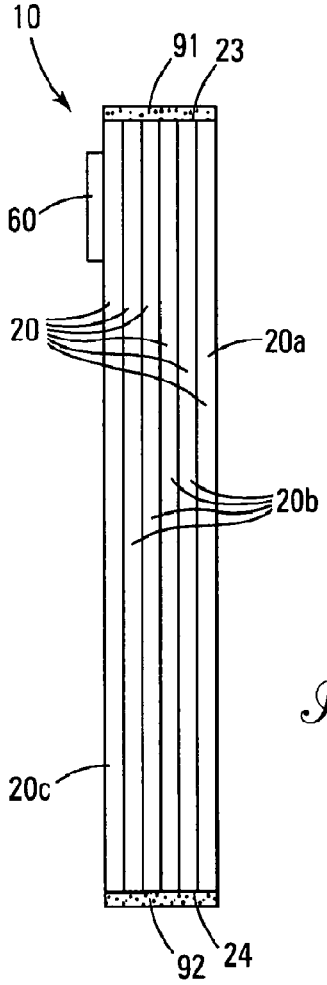
FIG. 4 is a side edge view of the invention in FIG. 1 and FIG. 2 as seen in the direction arrows B-B in FIG. 2.

As shown in FIGS. 2, 3 and 4, a magnet 60 is attached to the second major surface 22 of the lowermost sheet 20c, preferably within a header panel 30. The magnet 60 is preferably a thin, flexible magnet commonly referenced as a "refrigerator magnet". Such magnets are widely known and commercially available for a number of sources. Attaching a magnet 60 to the second major surface 22 of the lowermost sheet 20c renders the coupon mailer 10 suitable for releasable attachment to a metal vertical surface (not shown) such as a refrigerator, freezer, dishwasher, filing cabinet, etc.

Use

Each of the coupons 51 and/or 71 on the coupon mailer 10 include printed indicia 55 and/or 75 on the first major surface 21 as necessary and appropriate for creating redeemable coupons 51 and/or 71. The coupons 51 and/or 71 on a given sheet 20 may all be redeemable with a single business, or may be individually redeemable with several different businesses (e.g., cooperative advertising).

The coupon mailer 10 may be distributed to potential customers through the mail or hand distributed. Once the consumer receives the coupon mailer 10, the consumer may detach the footer panel 80 along the line of separation 74, and mount the coupon mailer 10 to a vertical metallic surface by the magnet 60 for subsequent perusal and use. When the consumer wishes to utilize one of the coupons 51 or 71, the coupon 51 or 71 may be removed from the first set of coupons 50 or the second set of coupons 70 (if provided) along the lines of separation 54 or 74.

Individual coupons 51 or 71 may be detached from each sheet 20 without detaching the other coupons 51 or 71 from the sheet 20 by simply separating the desired coupon 51 or 71 from the balance of the sheet 20 along the lateral y lines of separation 54 or 74 immediately above and immediately below the desired coupon 51 or 71, and then separating the desired coupon 51 or 71 from the spine 40 along the longitudinal x line of separation between the desired coupon 51 and the spine 40.

When the redemption period for the set of redeemable coupons 50 and/or 70 on the currently visible sheet 20 has expired, the consumer may simply remove that sheet 20 to reveal the next sheet 20 in sequence. Since the sheets 20 forming the coupon mailer 10 are chronologically stacked, the newly exposed sheet 20 will have coupons 51 and/or 71 with a more current redemption period.

Coupon mailers 10 of the present invention allow a single mailer 10 to include coupons 51 and/or 71 that are redeemable at different times in a format that makes it simple and easy for the consumer to understand and appreciate the redemption period of the coupons 51 and/or 71.

I claim:

1. A coupon mailer comprising:

a plurality of stacked sheets, each sheet including a top and a bottom edge, the top and bottom edges each define a length, such that the sheets are connected to each other proximate at least one of the top and bottom edges and in a lateral direction along the length defined by the top or the bottom edge, each sheet having a header panel, a footer panel, and a spine extending between the header and footer panels, the spine is connected to each of the header and footer panels and is laterally centered along the length defined by the top and bottom edges, the spine having a dimension supportable of indicia containing redemption information;

a first set of detachable coupons and a second set of detachable coupons are arranged along sides of the spine and are connected to the spine through lines of perforation, comprising:

the first set of detachable coupons is attached to one of a right or left side of the spine through a line of perforation, and is arranged in a column format along the right or left side of the spine and extending between the header and footer panels, each coupon of the first set of detachable coupons having opposite ends, one of the ends is attached to the right or left side of the spine through the line of perforation and the other end is not attached to the spine, the second set of detachable coupons is attached to the other of the right or left side of the spine through another line of perforation, and is arranged in a column format along the other of the right or left side of the spine and extending between the header and footer panels, each coupon of the second set of detachable coupons having opposite ends, one of the ends is attached to the other of the right or left side of the spine through the another line of perforation and the other end is not attached to the spine, each sheet having a surface with indicia disposed thereon, the indicia is disposed on at least one of the header panel and the spine, the indicia including redemption information, such that the redemption information on at least one of the header panel and the spine of an upper sheet has an earlier redemption period than a lower sheet;

each coupon of the first and second sets of detachable coupons having a surface with indicia disposed thereon, the indicia including redemption information, such that the redemption information of the first and second sets of detachable coupons on an upper sheet has an earlier redemption period than the first and second sets of detachable coupons on a lower sheet.

2. The coupon mailer of claim 1, wherein the plurality of stacked sheets includes at least two sheets.

3. The coupon mailer of claim 1, wherein the header panel is disposed at one of the top and bottom edges of the plurality of stacked sheets, and the footer panel is disposed at the other of the top and bottom edges of the plurality of stacked sheets.

4. The coupon mailer of claim 1, further comprising a bottom line of perforation that extends along the length defined by the bottom edge and is between the footer panel and the spine and the first and second sets of detachable coupons, wherein the footer panel is connected to the spine and the first and second sets of detachable coupons through the bottom line of perforation, such that the footer panel is detachable from the spine.

5. The coupon mailer of claim 1, wherein the header panel is integral with the spine.

6. The coupon mailer of claim 1, wherein the plurality of stacked sheets includes edges that are all aligned.

7. The coupon mailer of claim 1, wherein the plurality of stacked sheets including uniform height and width, and are a generally rectangular shape, such that the height is defined from the top edges to the bottom edges of the plurality of stacked sheets and represents a long side of the generally rectangular shape.

8. The coupon mailer of claim 1, wherein the first and second sets of detachable coupons are at least one of redeemable coupons for at least one of goods and services from a single business and redeemable coupons for at least one of goods and services from multiple businesses.

9. The coupon mailer of claim 1, wherein each coupon within each of the first and second sets of detachable coupons having at least one edge adjoining an edge of another coupon, such that the coupons within each of the first and second sets of detachable coupons are stacked adjacently in the column format.

10. The coupon mailer of claim 9, wherein the coupons within each of the first and second sets of detachable coupons are adjoined through lines of perforation.

11. The coupon mailer of claim 10, wherein the lines of perforation adjoining the first and second sets of detachable coupons laterally extend from the spine to lateral ends of each sheet.

12. The coupon mailer of claim 1, wherein the coupons within each of the first and second sets of detachable coupons are respectively detachable from the spine along the line of perforation and the another line of perforation.

13. The coupon mailer of claim 1, wherein the other end of each coupon that is not attached to the spine is a free end.

14. The coupon mailer of claim 1, wherein, for each respective sheet in the plurality of stacked sheets, the indicia disposed on at least one of the header panel and the spine includes an indication of the redemption period disposed on each coupon of the first and second sets of detachable coupons.

15. The coupon mailer of claim 1, wherein the redemption information of the indicia disposed on at least one of the header panel and the spine includes an expiration date.

16. The coupon mailer of claim 1, wherein the redemption information of the indicia disposed on each coupon of the first and second sets of detachable coupons includes an expiration date.

17. The coupon mailer of claim 1, further comprising a magnet disposed on a backside of a lower most sheet of the plurality of stacked sheets.

18. The coupon mailer of claim 17, wherein the magnet is disposed on a backside of only the lowermost sheet of the plurality of stacked sheets, such that the magnet is disposed on the backside of the header panel of the lowermost sheet.

19. A coupon mailer comprising: a plurality of stacked sheets, each sheet including a top and a bottom edge that define a length of each sheet, and the sheets are connected to each other proximate at least one of the top and bottom edges, each sheet having a header panel, a footer panel, and a spine extending between the header and footer panels, the spine is connected to the header and footer panels; a plurality of detachable coupons arranged in a column format along right and left sides of the spine, each coupon having opposite ends, one of the ends is attached to one of the right and left sides of the spine and the other end is not attached to the spine; each sheet having a surface with indicia disposed thereon, the indicia is disposed on at least one of the header panel and the spine, the indicia including redemption information, such that the redemption information on at least one of the header panel and the spine of an upper sheet has an earlier redemption period than a lower sheet; each coupon of the plurality of detachable coupons having a surface with indicia disposed thereon, the indicia including redemption information, such that the redemption information of the plurality of detachable coupons on an upper sheet has an earlier redemption period than the plurality of detachable coupons on a lower sheet, further comprising a bottom line of perforation that extends along the length defined by the bottom edge and is between the footer panel and the spine, the first set of detachable coupons, and the second set of detachable coupons, wherein the footer panel is connected to the spine and the first and second sets of detachable coupons through the bottom line of perforation, such that the footer panel is detachable from the spine.

20. The coupon mailer of claim 19, wherein the spine is laterally centered along the length defined by the top and bottom edges, the spine having a dimension supportable of indicia containing redemption information.

21. The coupon mailer of claim 19, wherein the plurality of detachable coupons comprising:

a first set of detachable coupons and a second set of detachable coupons arranged along the right and left sides of the spine, comprising:

the first set of detachable coupons is attached to one of the right or left side of the spine through a line of perforation, and is arranged in a column format along the right or left side of the spine and extending between the header and footer panels, each coupon of the first set of detachable coupons having opposite ends, one of the ends is attached to the right or left side of the spine through the line of perforation and the other end is not attached to the spine, the second set of detachable coupons is attached to the other of the right or left side of the spine through another line of perforation, and is arranged in a column format along the other of the right or left side of the spine and extending between the header and footer panels, each coupon of the second set of detachable coupons having opposite ends, one of the ends is attached to the other of the right or left side of the spine through the another line of perforation and the other end is not attached to the spine.

22. The coupon mailer of claim 21, wherein each coupon within each of the first and second sets of detachable coupons having at least one edge adjoining an edge of another coupon, such that the coupons within each of the first and second sets of detachable coupons are stacked adjacently in the column format, the coupons within each of the first and second sets of detachable coupons are adjoined through lines of perforation, the lines of perforation adjoining the first and second sets of detachable coupons laterally extend from the spine to lateral ends of each sheet.

*23. The coupon mailer of claim 1, in which redemption periods are consecutive calendar weeks.*

*24. The coupon mailer of claim 1, in which there is a plurality of coupons for any same redemption period.*

*25. The coupon mailer of claim 19, in which redemption periods are consecutive calendar weeks.*

*26. The coupon mailer of claim 19, in which there is a plurality of coupons for any same redemption period.*

* * * * *